Patented Oct. 2, 1951

2,570,084

UNITED STATES PATENT OFFICE 2,570,084

COMPLEX CHROMIUM AZO COMPOUND

Willy Widmer, Bottmingen, and Jakob Brassel, Basel, Switzerland, assignors to Ciba Limited, Basel, Switzerland, a Swiss firm No Drawing. Application December 15, 1947, Serial No. 791,930. In Switzerland January 6, 1947

3 Claims. (Cl. 260—150)

In Helvetica Chimica Acta, volume 20 (1937), pages 1026 and 1035, information is found on the manufacture of a chromium compound of the dyestuff from diazotized 1-amino-naphthalene-4-sulfonic acid and 1-hydroxynaphthalene-5-sulfonic acid. The chromium compound is prepared by treating the dyestuff with chromium trioxide ($CrO_3$). In this operation, the chromium trioxide plays the double role of an oxidizing agent and an agent yielding chromium; in this reaction, a hydroxyl group is introduced into the 2-position of the radical of the diazo component and chroming takes place at the same time. That in this procedure, rather large quantities of by-products are obtained, is readily understood. A check-up by the present applicants has shown that only an insignificant quantity of the chromium complex and a great amount of decomposition products are obtained. The elimination of these colored decomposition products is not possible by the methods customarily employed to purify dyestuffs on a commercial scale. Consequently, the product obtained by this process is not to be used for practical purposes, inasmuch as the dyeings which it produces are weak, grayish and not level. While in the light of the present disclosure these unfavorable properties obviously have to be attributed to the high percentage of troublesome impurities, it was not possible at all to predict that a hitherto unknown chromium complex which is free from such impurities would have such excellent tinctorial properties as would render it superior to all known dyestuffs of the same type i. e. complex chromium compounds of the dyestuffs from a diazotized 1:2- or 2:1-amino-hydroxynaphthalene-sulfonic acid and a hydroxynaphthalene sulfonic acid coupling in a position vicinal to the hydroxyl group.

Commercially useful dyestuffs of the type just named and a process for their manufacture are described in French Patent No. 850,530 where, incidentally, mention is made of the uselessness of the product mentioned at the beginning of the present text. This French patent indicates a process which serves to make complex chromium compounds of great tinctorial value by treating azo dyestuffs of the general formula

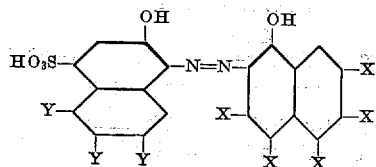

or

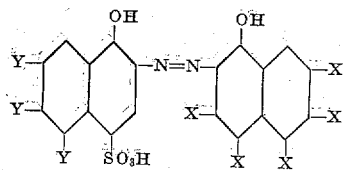

wherein Y stands for hydrogen atoms or any substituents and one X stands for an $SO_3H$ group and the other X's stand for hydrogen atoms, with an agent yielding chromium. The examples in that patent describe, among other things, the preparation of complex chromium compounds, containing about one chromium atom in the dyestuff molecule, of the following azo dyestuffs which correspond to either of the above formulae:

Diazotized 1-amino-2-hydroxynaphthalene-4-sulfonic acid, coupled with 1-hydroxynaphthalene-4-sulfonic acid; diazotized 2-amino-1-hydroxynaphthalene-4-sulfonic acid, coupled with 1-hydroxynaphthalene-5-sulfonic acid.

It is the object of the present invention to provide the chromium compound, containing about one chromium atom in complex union, of the azo dyestuff from diazotized 1-amino-2-hydroxynaphthalene-4-sulfonic acid and 1-hydroxynaphthalene-5-sulfonic acid, which chromium compound is practically free from colored impurities and dyes wool from a sulfuric acid bath in pure blue tints; the manufacture of this chromium compound is a further object of this invention.

There is no basis for a comparison of this new chromium compound with the technically unserviceable product which has become known through the publication in Helvetica Chimica Acta. As compared to the chromium compounds described in French Patent No. 850,530, the new chromium compound surprisingly presents such considerable advantages as, for example, superior levelling capacity, greater fastness to light or a considerably more beautiful appearance of the dyeing when viewed in artificial light.

This new complex chromium compound can be made by treating the azo-dyestuff which, in the form of its free acid, corresponds to the formula

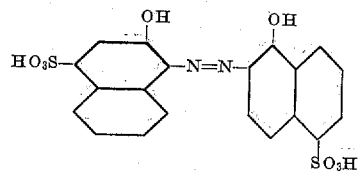

with a salt of trivalent chromium in such manner that there is produced a chromium compound containing in the dyestuff molecule about one atom of chromium in complex union.

The dyestuff corresponding to the above formula used as starting material in the present process may be obtained, for example, by coupling diazotized 1-amino-2-hydroxynaphthalene-4-sulfonic acid in an alkaline medium with 1-hydroxynaphthalene-5-sulfonic acid.

As salts of trivalent chromium there come into consideration principally, chromium fluoride, chromium sulfates, chromium acetate and chromium formate.

The treatment with the salt of trivalent chromium is advantageously conducted in an acid medium, and may be carried out under atmospheric or superatmospheric pressure. The formation of the chromium compound, which contains about one atom of chromium in complex union, is advantageously carried out under reaction conditions in which at least the quantity required by theory of the agent yielding chromium is used, and the treatment is of prolonged duration and is conducted at a raised temperature, for example, at the boiling temperature.

The new chromiferous dyestuff obtainable by the present process is substantially free from colored impurities and yields on wool from a dyebath containing sulfuric acid uniform, pure blue shades. It is a chromium compound, containing about one atom i. e. from 0.9 to 1.1 atoms of chromium in complex union in the dyestuff molecule, of the azo-dyestuff which, in the form of its free acid corresponds to the formula

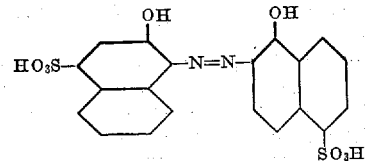

The chromiferous dyestuff is suitable for dyeing various materials, especially those of animal character such as casein and gelatine, and chiefly for dyeing or printing animal textile fibers such as wool, silk and leather, and also fibers which possess similar dyeing properties such as artificial staple fibers of casein, animalised cellulose artificial silk, and, if desired, also for dyeing or printing artificial fibers of superpolyamides or superpolyurethanes and the like. There are obtained principally blue to navy blue tints which are distinguished more especially by very good fastness to light.

The following examples illustrate the invention, the parts and percentages being by weight:

*Example 1*

474 parts of the dyestuff obtained by coupling diazotised 1-amino-2-hydroxynaphthalene-4-sulfonic acid with 1-hydroxynaphthalene-5-sulfonic acid are boiled with 10,000 parts of hot water and 1,000 parts of a chromium sulfate solution (corresponding to 80 parts of $Cr_2O_3$) for 20 hours in a reflux apparatus. After the addition of sodium chloride the reaction mixture is allowed to cool. The precipitated chromium compound is separated by filtration. When dry it is a dark powder with a bronze luster, which dissolves in water with a dichroic red-blue coloration and in concentrated sulfuric acid with a blue-green coloration, and dyes animal fibers pure, uniform, fast blue tints.

*Example 2*

100 parts of well wetted wool are entered at 40° C. into a dyebath which contains 1 part of the dyestuff obtained as described in Example 1, 40 parts of sulfuric acid of 10 per cent. strength and 3000 parts of water, and the bath is slowly heated to the boil. After boiling for ¼ hour a further 40 parts of sulfuric acid of 10 per cent. strength are added, and the dyeing is continued at the boil for 1½ hours. The wool is then rinsed in the usual manner and finished. The pure blue dyeing so obtained is distinguished by its uniformity and very good fastness to light.

What is claimed is:

1. Process for the manufacture of a complex chromium compound which comprises treating the azo dyestuff which, in the free acid state corresponds to the formula

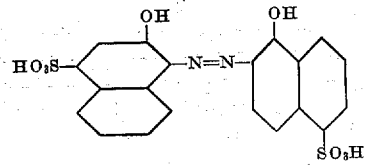

with a salt of trivalent chromium in a quantity which corresponds to at least one chromium atom per dyestuff molecule.

2. A chromium compound containing about one atom of chromium in complex union in the molecule of the azo dyestuff obtained by treating the dyestuff which in the free acid state corresponds to the formula with a salt of trivalent chromium

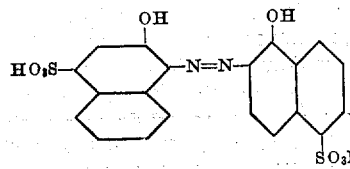

in a quantity which corresponds to at least one chromium atom per dyestuff molecule.

3. A chromium compound containing about one atom of chromium in complex union in the molecule of the azo dyestuff obtained by treating the dyestuff which in the free acid state corresponds to the formula

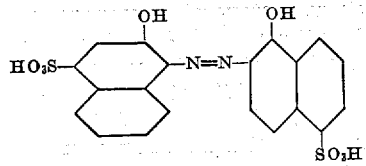

in an aqueous reaction medium at substantially boiling temperature with a salt of trivalent chromium in a quantity which corresponds to at least one chromium atom per dyestuff molecule.

WILLY WIDMER.
JAKOB BRASSEL.

REFERENCES CITED

The following references are of record in the file of this patent:

UNITED STATES PATENTS

| Number | Name | Date |
|---|---|---|
| 1,237,183 | Engi et al. | Aug. 14, 1917 |
| 2,010,613 | Straub et al. | Aug. 6, 1935 |

FOREIGN PATENTS

| Number | Country | Date |
|---|---|---|
| 850,530 | France | Sept. 11, 1939 |

OTHER REFERENCES

Fierz-David: Helvetica Chimica Acta, vol. 20, 1937, pages 1024 to 1026 and 1035.

Certificate of Correction

Patent No. 2,570,084                                             October 2, 1951

WILLY WIDMER ET AL.

It is hereby certified that error appears in the printed specification of the above numbered patent requiring correction as follows:

Column 4, line 31, strike out the words "with a salt of trivalent chromium" and insert the same before "in a quantity" in line 39, same column;

and that the said Letters Patent should be read as corrected above, so that the same may conform to the record of the case in the Patent Office.

Signed and sealed this 8th day of January, A. D. 1952.

[SEAL]

THOMAS F. MURPHY,
*Assistant Commissioner of Patents.*